May 20, 1947. P. PARK 2,420,719
CAMERA LIGHT PROTECTING SLEEVE
Filed Feb. 19, 1945
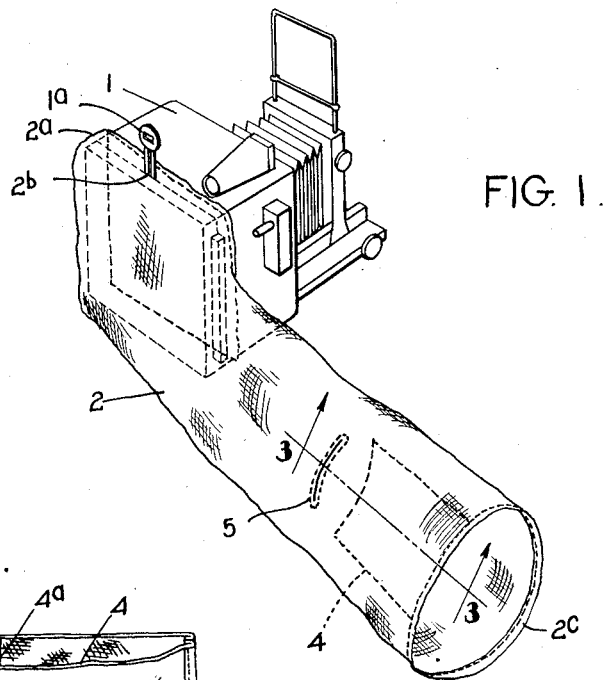
FIG. 1.
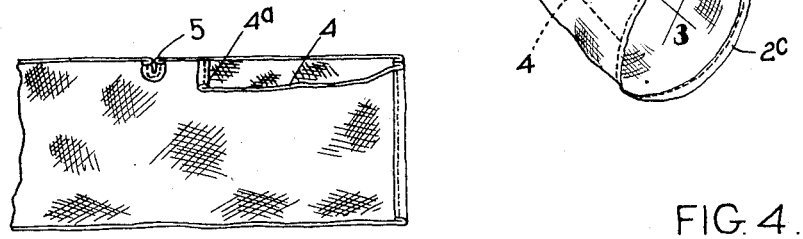
FIG. 3.
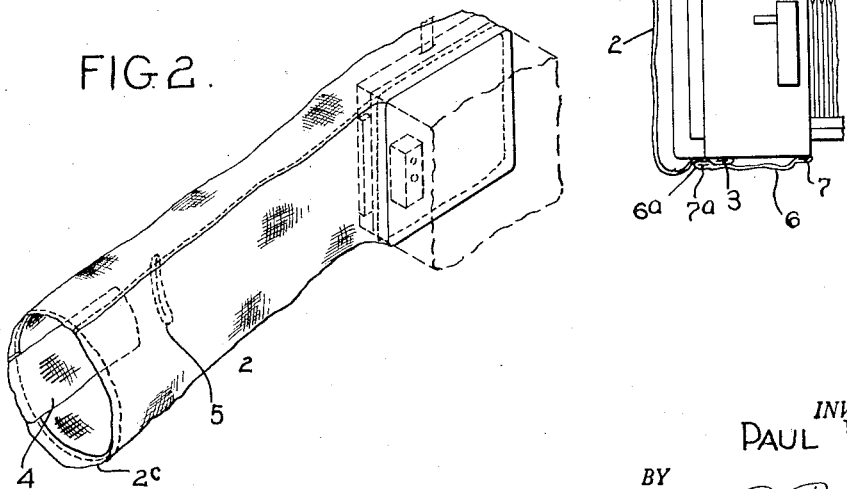
FIG. 4.
FIG. 2.
INVENTOR.
PAUL PARK
BY
A. B. Bowman
ATTORNEY Patented May 20, 1947

2,420,719

UNITED STATES PATENT OFFICE 2,420,719

CAMERA LIGHT PROTECTING SLEEVE

Paul Park, Campo, Calif.

Application February 19, 1945, Serial No. 578,654

3 Claims. (Cl. 95—20)

My invention refers to a camera light protecting sleeve and the objects of my invention are:

First, to provide such a sleeve so that the conventional type of light-sensitive slides can be loaded into the camera in a lighted room or out-of-doors;

Second, to provide such a sleeve with an inside pocket enabling the temporary storage of several slides in a convenient place accessible from within the sleeve and thus allowing transfer of a slide directly from this pocket to a camera;

Third, to provide a sleeve of this character with a slit opening for the insertion of the operator's hand and an open end to allow the operator to reach into a case containing slides to obtain additional slides for transfer directly to the camera or for reloading said pocket;

Fourth, to provide such a device with an additional safe guard, herein designated a hood portion, to enclose a major portion of the camera and to provide a double seal against light infiltration between the sleeve and the camera;

Fifth, to provide such a sleeve in a form which is light in weight and small in bulk when folded; and Sixth, to provide a sleeve and hood portion which is simple and practical to manufacture, easy to attach and remove, convenient and efficient in use and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a view of my invention, in perspective, attached in operative position to a camera, the open end being shown extended or open to facilitate the illustration of the construction and with the mouth of the inside pocket also open or extended; Fig. 2 is another similar view of my invention with a portion of the camera being broken away; Fig. 3 is a fragmentary detail view, sectional in character, taken on the line 3—3 in Fig. 1, to show the construction of the inside pocket and the slit opening for the insertion of the operator's hand or arm; Fig. 4 is a modified form showing a fragmentary detail view, also partly sectional in character, showing the camera in part in side elevation, and sleeve and hood portion in section to facilitate the illustration of how the hood portion is inserted over a major portion of the camera forming a double seal against light entering between the camera and the sleeve.

Similar characters of reference refer to similar parts and portions throughout the several views of the drawings.

Referring now to these drawings, the numeral 1 designates the camera, the details of which are not material in this application for patent.

The sleeve 2 comprised preferably of closely woven black sateen cloth, or similar flexible material which will not pass light, is made in the form of an open cylinder with the camera engaging end 2a made elastic by incorporating a rubber band 3 within a hem at this end of the sleeve, as shown best in Fig. 4. This camera-engaging end is adapted to be placed over the rear portion of the camera 1 and if any extending camera member 1a at the rear of said camera needs to be operated from outside the sleeve 2, the sleeve is suitably slitted as at 2b to accommodate such extending member and a band of elastic material is incorporated in the hemmed edges of this slit so that the said member 1a is tightly grasped to prevent light from entering the sleeve at this point.

The outer end 2c of the sleeve is open structurally but in use the folds of cloth at this end are crumpled together to prevent light from entering this end as hereinafter explained more fully. Extending inwardly from this outer end 2c I provide an inside pocket 4 of rectangular shape and comprised of a single thickness of cloth material marginally sewed to the sleeve on three edges thereof leaving the mouth 4a open towards the slit 5, which slit allows the entrance of the operator's hand.

To provide a double seal against light entering the sleeve, I provide an additional hood portion 6 which is a shorter sleeve or cylinder of similar material with elastic bands 7 and 7a incorporated into the hems at each open end of the hood portion, as shown in Fig. 4 only of the drawings. This hood portion 6 is adapted to encase a major portion of the camera as shown.

In use, this hood portion 6 is first placed on the camera and after the camera engaging end 2a of the sleeve is placed on the rear side of the camera, the end 6a of the hood portion placed over the end 2a of the sleeve all as indicated in Fig. 4. The slit 2b will, of course, necessarily be made to register with any extending member or members 1a. If the pocket 4 already contains light sensitive slides the operator need only reach through the slit 5 and, keeping the outer end 2c of the sleeve closed, remove a slide from the pocket 4 and perform the necessary manipulation of the same to insert this slide into the camera all within the darkened enclosure of the sleeve 2. If the pocket 4 becomes exhausted of slides, the sleeve 2 may be used to provide a darkened passage between a case of slides and the pocket 4 simply by turning the hand inside the sleeve towards the end 2c of the sleeve and while the sleeve provides protection reaching into said case and extracting additional slides to re-load the pocket 4 or transfer a slide directly from said case to the camera.

Though I have shown and described a particular construction, combination and arrangement of parts and portions, I do not wish to be limited to this particular construction, combination and arrangement but desire to include in the scope of my invention the construction, combination and arrangement susbtantially as set forth in the appended claims.

Having thus described my invention, what I claim as new and desire to secure by Letters Patent is:

1. The combination with a camera, of a light protecting sleeve, and, an internal pocket positioned in said sleeve near its extended end for the temporary storage of photographic slides.

2. The combination with a camera of a light protecting sleeve having one end adapted to fit over the rear portion of said camera and the other end open, and having a slit in the side wall intermediate said ends for the insertion of the operator's hand, and an internal pocket for the temporary storage of photographic plates and slides near the open end of said sleeve with the open end near said slit.

3. The combination with a camera of a light protecting sleeve having one end adapted to fit over the rear portion of said camera and the other end open, and having a slit in the side wall intermediate said ends for the insertion of the operator's hand, an internal pocket for the temporary storage of photographic plates and slides, the mouth of said pocket being disposed toward said slit, a second slit near the end adapted to fit over the rear portion of the camera to allow the protrusion of any camera member extending from the rear of said camera, and an elastic band incorporated with the marginal hem around said second slit.

PAUL PARK.

REFERENCES CITED

The following references are of record in the file of this patent:

UNITED STATES PATENTS

| Number  | Name     | Date           |
|---------|----------|----------------|
| 870,751 | Welsh    | Nov. 12, 1907  |
| 437,630 | Spiro    | Sept. 30, 1890 |
| 558,348 | Brockway | Apr. 14, 1896  |
| 728,538 | Brown    | May 19, 1903   |

FOREIGN PATENTS

| Number  | Country       | Date          |
|---------|---------------|---------------|
| 8,313   | Great Britain | July 9, 1885  |
| 676,693 | France        | Dec. 14, 1929 |